United States Patent
Disantis

(10) Patent No.: US 10,468,785 B1
(45) Date of Patent: Nov. 5, 2019

(54) CRIMP SLEEVE

(71) Applicant: The National Telephone Supply Company, Cleveland, OH (US)

(72) Inventor: Raymond Disantis, Willoughby Hills, OH (US)

(73) Assignee: The National Telephone Supply Company, Cleveland, OH (US)

( * ) Notice: Subject to any disclaimer, the term of this patent is extended or adjusted under 35 U.S.C. 154(b) by 990 days.

(21) Appl. No.: 14/934,843

(22) Filed: Nov. 6, 2015

Related U.S. Application Data

(60) Provisional application No. 62/084,731, filed on Nov. 26, 2014.

(51) Int. Cl.
*F16G 11/02* (2006.01)
*H01R 4/20* (2006.01)

(52) U.S. Cl.
CPC .................................. *H01R 4/20* (2013.01)

(58) Field of Classification Search
CPC ....... H01R 43/058; H01R 4/183; F16G 11/02; F16G 11/14; F16G 11/146
See application file for complete search history.

(56) References Cited

U.S. PATENT DOCUMENTS

| | | | | |
|---|---|---|---|---|
| 2,151,032 A | * | 3/1939 | Jensen ................... | H01R 4/183 140/113 |
| 2,209,673 A | * | 7/1940 | Bratz ..................... | F16G 11/02 24/114.5 |
| 2,832,118 A | * | 4/1958 | Ehmann .................. | F16G 11/02 16/108 |
| 2,895,195 A | * | 7/1959 | Ehmann .................. | F16G 11/02 16/108 |
| 3,055,412 A | * | 9/1962 | Dibner .................. | H01R 43/058 29/517 |
| 3,522,961 A | * | 8/1970 | Boyd, Sr. ................ | F16G 11/02 174/79 |
| 3,583,060 A | * | 6/1971 | Sigmans ................ | B21K 25/00 140/111 |
| 3,626,363 A | * | 12/1971 | McIver ................... | H01R 4/20 439/880 |
| 3,638,975 A | * | 2/1972 | Buettner ................. | F16G 11/02 24/114.5 |
| 3,705,444 A | * | 12/1972 | Wernsing ................ | F16G 11/02 24/114.5 |
| 4,408,926 A | * | 10/1983 | Werner ..................... | F16B 2/14 403/300 |
| 4,529,230 A | * | 7/1985 | Fatula, Jr. .......... | G01N 30/6039 285/341 |
| 4,976,132 A | * | 12/1990 | Shaffer ................ | H01R 43/058 29/753 |

(Continued)

*Primary Examiner* — Daniel J Wiley
(74) *Attorney, Agent, or Firm* — Fay Sharpe LLP; James E. Scarbrough

(57) ABSTRACT

A crimp sleeve assembly includes a body made from titanium and has a first open end and a second closed end. The crimp sleeve crimps a Nitinol wire and a PTFE coated stainless steel wire. An axial end stop sleeve assembly has a sleeve crimped by an axial die assembly which forms a tip of the sleeve into a closed end bullet and/or tapered nose wherein the sleeve is crimped onto an end of a wire rope such that the wire rope does not protrude from the closed end bullet and/or tapered nose and wherein the axial die assembly minimizes flash during crimping.

8 Claims, 8 Drawing Sheets

(56) References Cited

U.S. PATENT DOCUMENTS

| | | | | |
|---|---|---|---|---|
| 5,499,448 | A | * | 3/1996 | Tournier ................ H01R 4/183 29/862 |
| 5,816,094 | A | * | 10/1998 | Birks ..................... F16G 11/02 72/416 |
| 6,035,692 | A | * | 3/2000 | Lucas .................... B21F 15/06 29/517 |
| 6,170,145 | B1 | * | 1/2001 | Lucas .................... B21F 15/06 29/282 |
| 6,261,137 | B1 | * | 7/2001 | Wilcox ................. H01R 4/183 174/84 C |
| 6,641,444 | B2 | * | 11/2003 | Hanazaki ............... H01R 11/11 439/877 |
| 6,838,620 | B2 | * | 1/2005 | Murakami ............ H01R 4/206 174/84 C |
| 6,926,313 | B1 | * | 8/2005 | Renzi ................. B01J 19/0093 285/342 |
| 7,606,609 | B2 | | 10/2009 | Muranushi et al. |
| 2001/0002508 | A1 | * | 6/2001 | Yamakawa .......... H01R 43/058 29/753 |
| 2008/0113553 | A1 | * | 5/2008 | Legrady ............... H01R 4/2404 439/585 |
| 2010/0242568 | A1 | * | 9/2010 | Battenfeld ............... B21J 13/02 72/407 |

* cited by examiner

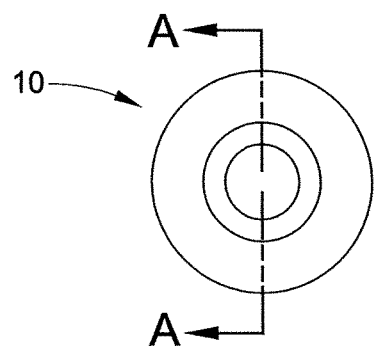
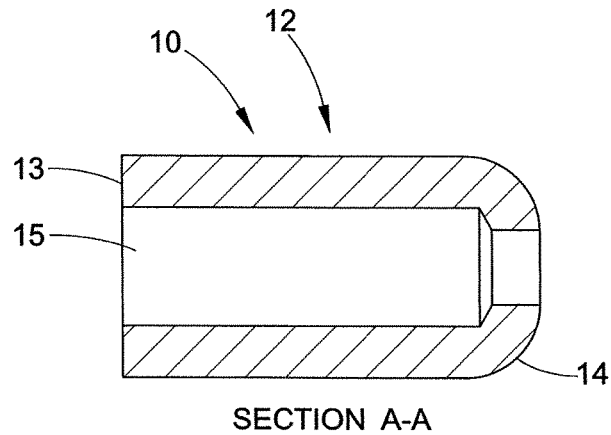
FIG. 2A    FIG. 2B
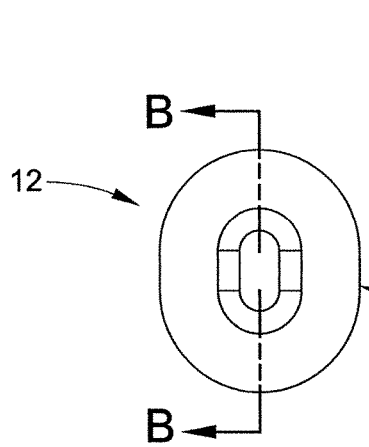
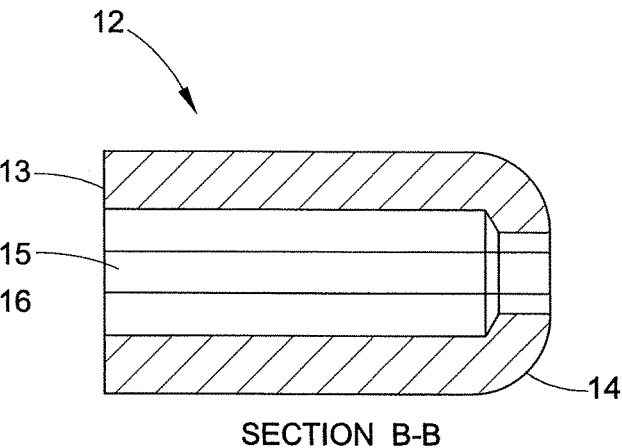
FIG. 3A    FIG. 3B

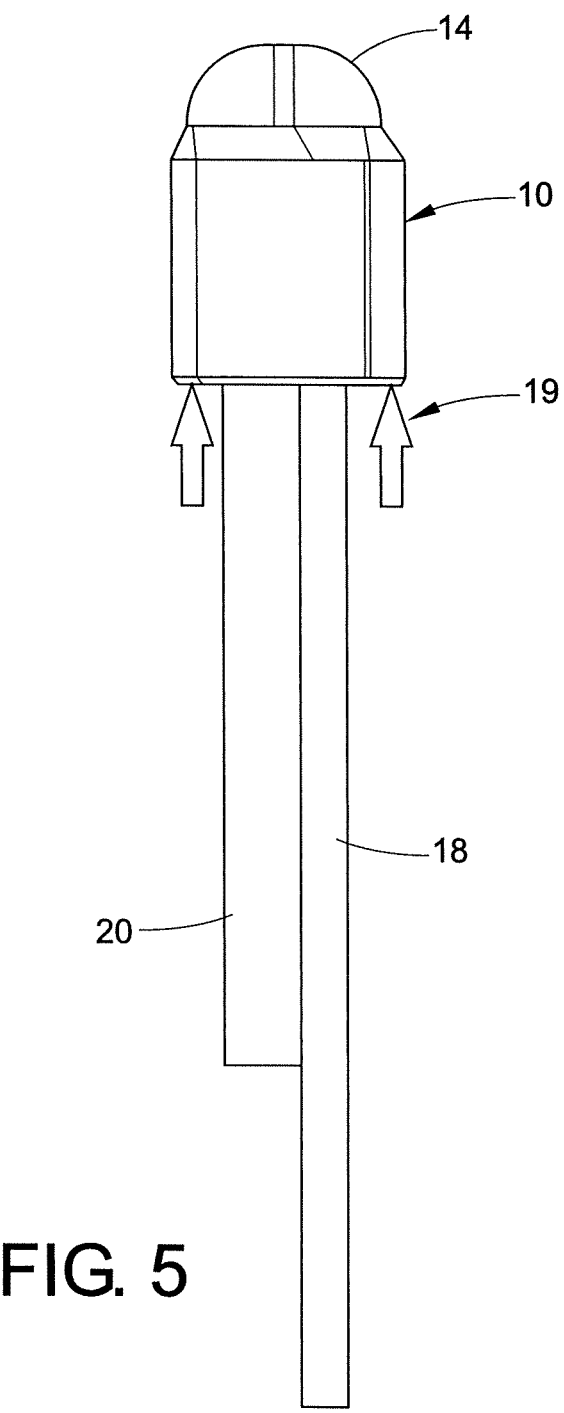
FIG. 5
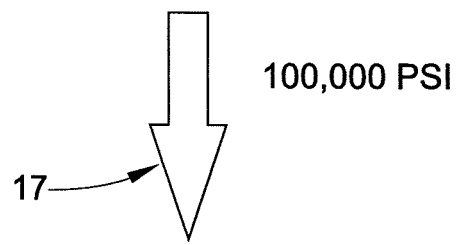

SECTION B-B

CRIMP SLEEVE

CLAIM OF PRIORITY

This application claims priority from U.S. Provisional Patent Application Ser. No. 62/084,731, filed on Nov. 26, 2014, the entirety of which is hereby incorporated by reference herein.

BACKGROUND OF THE DISCLOSURE

This disclosure relates to crimping sleeves. More particularly, it relates to a crimping sleeve for use in small areas such as used in commercial or industrial applications. Referring to FIG. 1, an existing enclosure or tube has a small envelope E within it in which the crimp sleeve at joint J must be used to join wire W to fiber F. The small envelope must accommodate both the crimp sleeve length and the crimp sleeve travel based on pull wire travel along a longitudinal direction.

End stops for cables and wire are used throughout a multitude of industries. One of the current methods uses a standard crimp sleeve with tooling that swages material between two dies transverse to the wire.

Another method uses a knot alone or a knot with a sleeve, which is used primarily for synthetics. Another method uses a solder ball, braze or weld on an end wire, which results in high performance tensile strength. Still another method uses a potting compound in conjunction with a sleeve on the end of wire.

A common method for swaging ferrules onto tubes for sealing and splicing applications has been in use for many years. This method axially swages ferrules onto tubes using forming dies built into the coupling assembly or the valve.

However, there exists a need for high performance stop sleeves that have strength equal to strength of the cable or wire. These sleeves must also be small in size relative to the diameter of the rope with no or minimal flash from crimping. These stop sleeves must also be easy to apply and crimp. The primary industry to use these stop sleeves is the industrial or commercial industry and the materials used need to be strong and relatively inert. The sizes of the applications are very small and exacting. One existing end stop has been a solder ball. This method is process sensitive especially with inert materials such as stainless steel and Nitinol.

Given the low coefficient of friction of Polytetrafluoroethylene (PTFE) coatings relative to commonly used ductile crimp materials such as copper and aluminum, there is a need for a crimp sleeve material which has a high coefficient of friction to PTFE and still remains ductile. Ductility is a critical feature of the sleeve material. There is also a need to provide crimp sleeve material which has a high coefficient of friction since the gripping surface area of the sleeve is limited by usable space in the enclosure. It is also important to use a high coefficient of friction material because methods of squeezing a highly ductile material such as copper to a greater degree only extrudes material outside the usable space of the enclosure. Titanium is such a material which has a high coefficient of friction and is less ductile than copper but more ductile than aluminum. Thus, there is a need to provide a crimp sleeve made of titanium.

Thus, an objective of the disclosure is to splice a Nitinol spring wire to a PTFE coated stainless steel wire. Both wires extend from the non-bullet nose end of the splice. There is no existing method for doing this. This configuration is a new method/design that replaces the existing splice method in the design.

Another objective of the disclosure is to crimp an end stop sleeve onto the end of a wire rope such as synthetic rope or stranded rope wherein the stop is to be crimped on the end. Existing methods use soldering or brazing a ball that acts as a stop onto the end of the wire. However, this does not have good process repeatability.

Thus, there is a need for new methods of splicing wire with a splice sleeve and crimping a stop sleeve onto a wire rope which overcomes the above mentioned difficulties, while providing better overall results. Still other benefits and aspects of the disclosure will become apparent upon a reading and understanding of the following detailed description.

SUMMARY OF THE DISCLOSURE

The present disclosure relates to crimping and splicing sleeves. More particularly, it relates to a splice sleeve and end stop sleeve used in small areas such as in commercial or industrial applications.

One embodiment of this disclosure relates to high strength, axially pressed end stops on cables and wires. The strength of the end stop approaches or exceeds the strength of the cable or wire. The size of the end stops are relatively small with minimal or no parting flash from the dies. Since there is no flash, the end stop crimp is highly efficient. Virtually all of the material is compressed in and around the wire or cable with minimal waste. The axial end stop is created with tooling that applies relatively even pressure to the sleeve thus swaging the material entirely around the cable or wire with relatively equal compression forces. These compressive forces are significantly increased from the axial force of the press by the angle in the tooling dies. An axial end stop sleeve assembly includes a sleeve crimped by an axial die assembly which forms a tip of the sleeve into a closed end bullet and/or tapered nose wherein the sleeve is crimped onto an end of a wire rope such that the wire rope does not protrude from the closed bullet end; wherein the axial die assembly minimizes flash during crimping.

One embodiment of the disclosure uses a compression ratio for the axial end stop system as follows: ((volume of wire)+(volume of crimp sleeve))/(volume of die cavities)

The compression ratio varies for every application based on how much the wire or cable material elongates when subjected to the compression of the ferrule (Reference Poisson ratio of material). In most cases the ratio is just slightly over 1:1.

In another embodiment of this disclosure, described is a crimp sleeve assembly comprising a body made from titanium, the body comprising: a first open end; and a second closed end; wherein the crimp sleeve crimps a Nitinol wire and a PTFE coated stainless steel wire.

Another embodiment of the disclosure is the axial end stop also has a flush end. There is no wire or cable protruding from the end of the stop which is common with existing transverse crimped end stops.

Another aspect of the disclosure is the tooling of the axial crimp is removed for use in the application. Thus the axial crimp stands on its own as the device that provides a high performance end stop on wires and cables. In contrast, in existing systems the ferrules are part of an assembly that includes nuts and other features in the body of the connector that act as tooling. This results in much more size and complexity in the end product than the present disclosure.

Another embodiment of the disclosure is the materials for the axial crimp end stop sleeve need to be highly ductile such as copper and titanium. Titanium is the preferred material for the sleeves since it has the highest coefficient of friction to PTFE and remains ductile in the limited space provided by the enclosure. It is also important to use a high coefficient of friction material such as titanium because such methods of squeezing a material to a greater degree such as a highly ductile material such as copper only extrudes material outside the usable space of the device.

Yet another embodiment of the disclosure is virtually absolute flash elimination can be achieved by adding control grooves in the outer diameter (OD) of the axial crimp end stop sleeve at the parting line of the tooling, where flash occurs. These grooves collapse inward during the press thus eliminating flash.

Still another embodiment of the disclosure is axial end stop tooling including an upper punch die and a lower form die. A taper in the inner hole of the tooling roughly matches that of the end stop sleeve. Force on the tooling is applied in the sleeve axis direction compressing the sleeve inner diameter (ID) onto the OD of the wire rope via the tapers in the die and punch tooling. The lower die may be split to facilitate easy removal of the finished part. There may also be an ejector to release to split dies from the die holder.

Another aspect of the disclosure is to splice a Nitinol spring wire to a PTFE coated stainless steel wire wherein both wires extend from the non-bullet nose end of the splice sleeve.

Another embodiment of the disclosure is squeezing a more ductile material to impart more normal force in the crimp will not damage the wire and not compromise the strength of the crimp assembly.

Another embodiment of the disclosure is a finished crimp not to exceed a specified axial boundary or envelope.

Another embodiment of the disclosure is crimped wires which are flush to the end of the crimped sleeve (i.e., there are no wires protruding).

Another embodiment of the disclosure is a flush wire end of the crimp sleeve to be rounded (i.e., a bullet nose).

Another embodiment of the disclosure is the length of crimp sleeve after press is to be less than a specified length.

Another embodiment of the disclosure is the tensile requirement should exceed 100,000 psi for crimping the Nitinol wire to a PTFE coated stainless steel wire.

Another embodiment of the disclosure is the length of the crimp sleeve after press is to be the same as the axial boundary.

Still other embodiments of the disclosure will become apparent upon a reading and understanding of the following detailed description.

BRIEF DESCRIPTION OF THE DRAWINGS

FIG. 2A is a front elevational view of a round crimp sleeve before being crimped in accordance with a preferred embodiment of the disclosure;

FIG. 2B is a side cross-sectional elevational view of the crimp sleeve of FIG. 2A taken along lines A-A;

FIG. 3A is a front elevational view of a flattened sleeve in accordance with an aspect of the disclosure;

FIG. 3B is a side cross-sectional elevational view of the sleeve of FIG. 3A taken along lines B-B;

FIG. 5 illustrates a diagram of tensile load requirement for crimping the Nitinol wire and PTFE coated wire;

DETAILED DESCRIPTION OF THE DISCLOSURE

Figure 1:
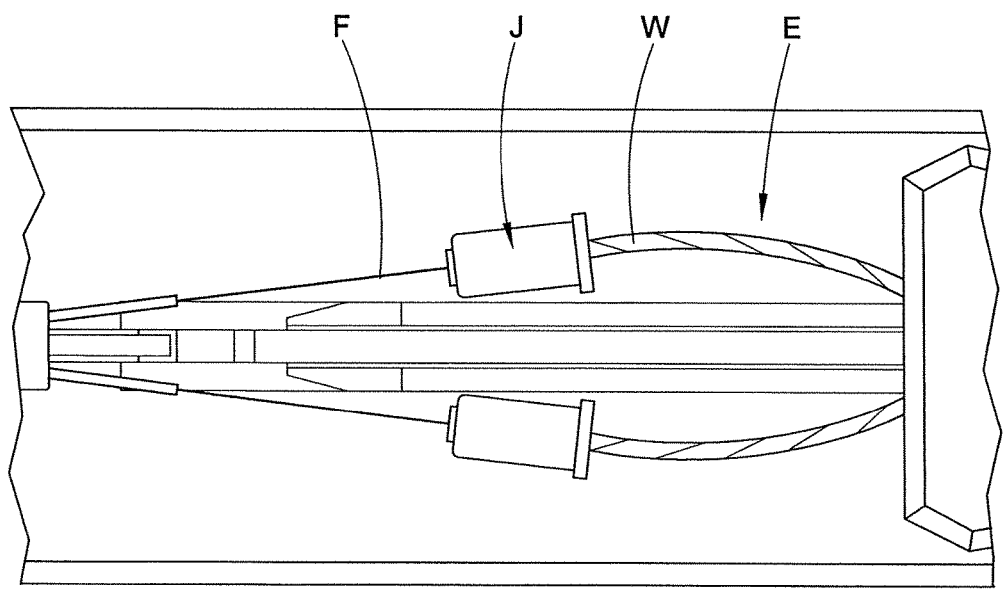
FIG. 1 illustrates an existing enclosure housing a joint between a wire and fiber.

The present disclosure relates to splice and end stop sleeves. The sleeves are described in detail below.

More particularly, referring to FIGS. 2A and 2B, a crimp splice sleeve 10 is made from titanium in accordance with a preferred embodiment of the disclosure. The sleeve is made using a tube 12 machined with a first end 13 having an opening 15 and a bullet nose closed end 14.

Referring to FIGS. 3A and 3B, the tube 12 may or may not be slightly flattened into an oval shaped cross section 16. Given the finish size constraint, an oval shaped cross section may be also necessary to allow insertion of both wires into the sleeve in as small a cavity volume as possible. Machining a sleeve 10 with a bullet nose end 14 eliminates the need for adding the bullet nose in a secondary operation.

The resulting compression ratio of the crimp is in the range of about 1.25 to 1.10. The compression formula is as follows:

$$(((\text{volume of wire})+(\text{volume of crimp sleeve}))/(\text{volume of die cavities})) = \text{Compression Ratio}$$

Figure 4:
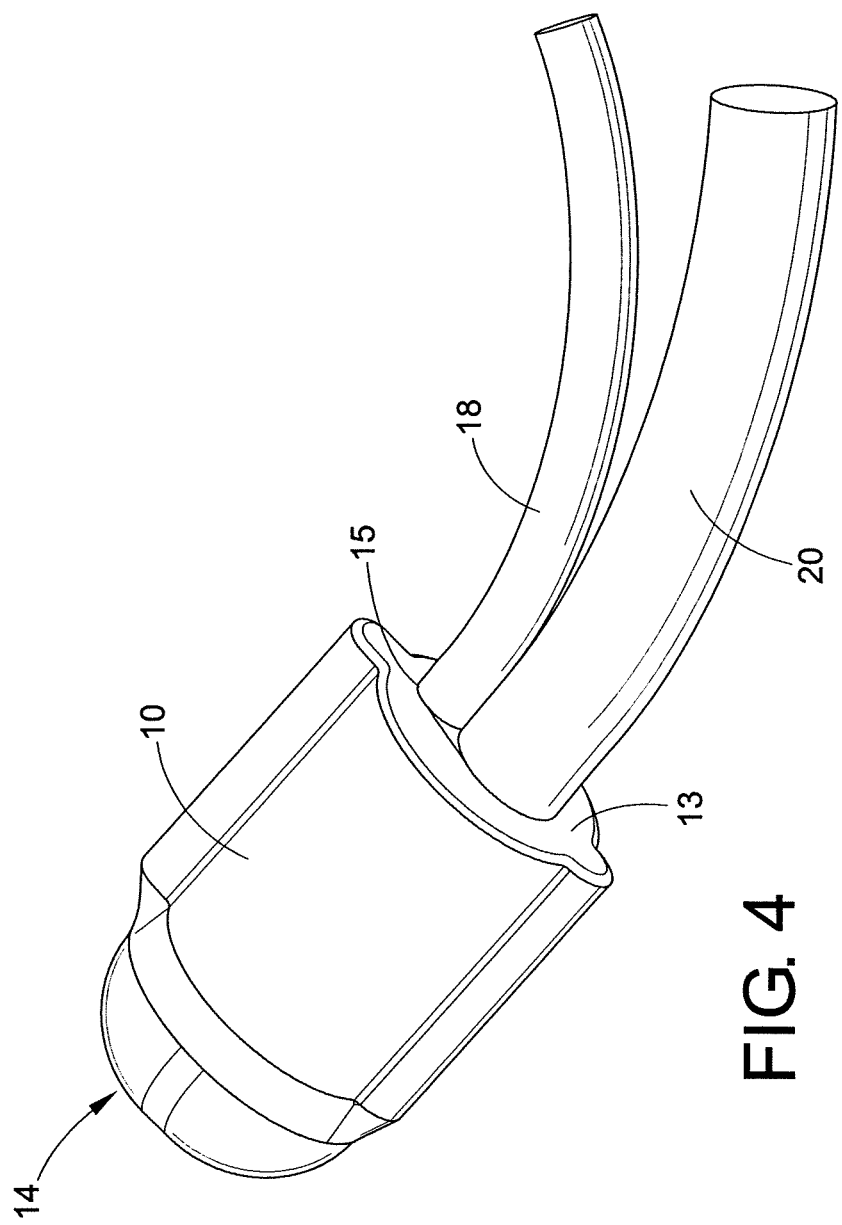
FIG. 4 is a perspective view of a crimp sleeve with bullet nose end after being crimped in accordance with another aspect of the disclosure.

FIG. 4 illustrates the crimped sleeve 10 with a bullet nose end 14 with open end 13 and Nitinol wire 18 and PTFE coated stainless steel wire 20 extending from opening 15.

FIG. 5 illustrates a diagram of the tensile load requirement (100,000 pounds per square inch (psi) or more) shown by force arrows 17, 19 in opposing directions for crimping the Nitinol wire 18 and the PTFE coated stainless steel wire 20 with the bullet end splice sleeve.

Thus, one embodiment of the disclosure is to splice Nitinol spring wire 18 to a PTFE coated stainless steel wire 20. The wires can vary in size such as in the range of about 0.005 inches to 0.030 inches. However, other diameters are contemplated by the disclosure. Both wires 18, 20 extend from the non-bullet end 13 of the splice. Another aspect of the disclosure is a bullet nose tip 14 with no wires protruding from the nose tip. The sleeve can be used with lap splice wires of different diameters and materials. The sleeve can also be very small miniature size.

The finished crimp is not to exceed a specified diameter axial boundary or envelope (an example would be around 0.050 inches or so). The crimped wires are to be flush to the end of the crimped sleeves (no wires protruding). The flushed wire end of the crimp sleeve is to be rounded (i.e., a bullet nose). The length of the crimp sleeve after press is to be less than a specified length (an example would be about 0.100 inches or so). The tensile requirement is to be 100,000 psi minimum for crimping the wire 18 to the PTFE coated stainless steel wire 20. (FIG. 5).

Another embodiment of the disclosure relates to high strength, axially pressed end stops on cables and wires. The strength of the end stop approaches or exceeds the strength of the cable or wire. The size of the end stops are relatively small there is with minimal or no parting flash from the dies. Since there is no flash, the end stop crimp is highly efficient. Virtually all of the material is compressed in and around the wire or cable with minimal waste. The axial end stop is created with tooling that applies relatively even pressure to the sleeve thus swaging the material entirely around the cable or wire with relatively equal compression forces. These compressive forces are significantly increased from the axial force of the press by the angle in the tooling dies.

An embodiment of the disclosure uses a compression ratio for the axial end stop system as follows: ((volume of wire)+(volume of crimp sleeve))/(volume of die cavities)

The compression ratio varies for every end stop application based on how much the wire or cable material elongates when subjected to the compression of the ferrule (Reference Poisson ratio of material). In most cases the ratio is just slightly over 1:1.

Figure 6:
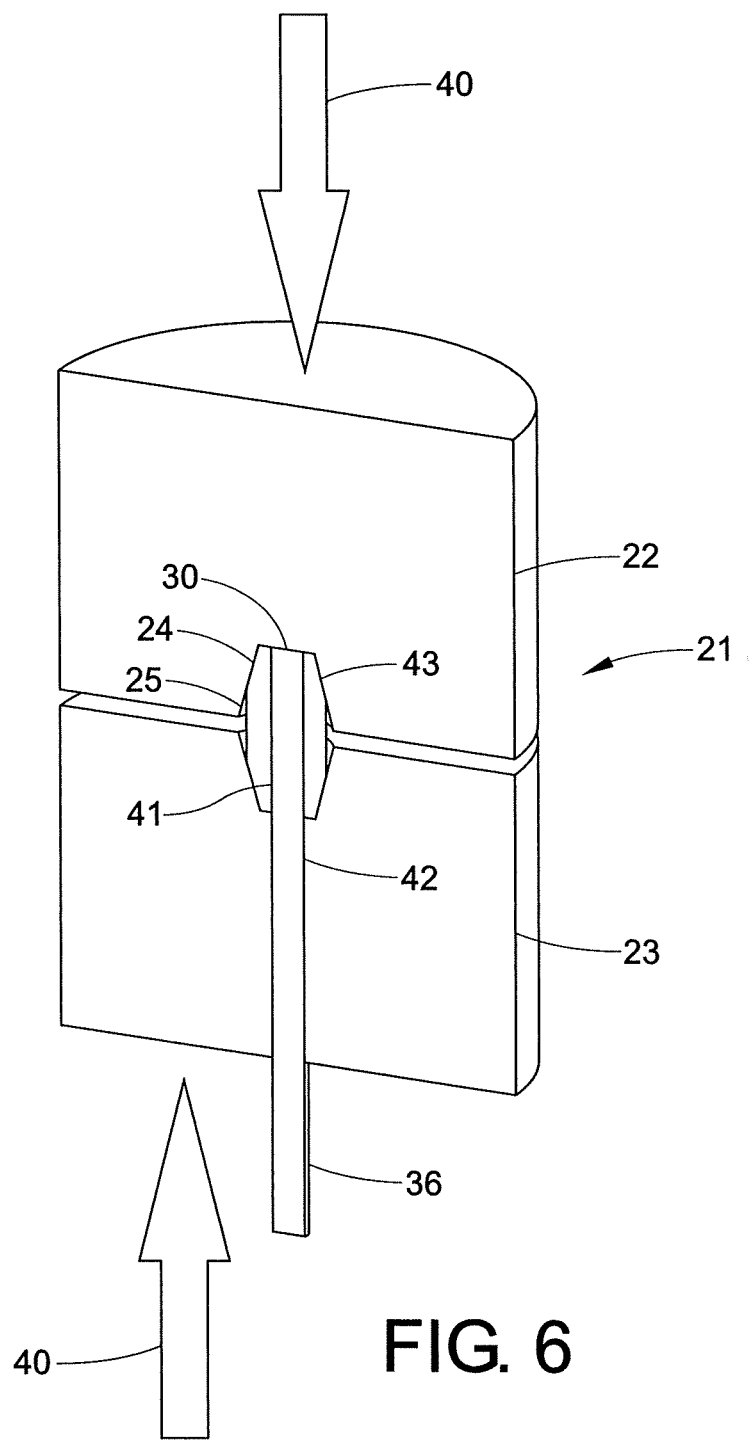
FIG. 6 is a perspective view of an axial stop sleeve within a die assembly in accordance with another embodiment of this disclosure.

Referring now to FIG. 6, an axial end stop tooling 21 includes an upper punch die 22 and a lower form die 23. A taper or angle 24 formed an inner opening 25 of the tooling roughly matches a taper 43 of end stop sleeve 30. Axial force 40 on the tooling is applied upwardly and downwardly in the sleeve longitudinal axis direction compressing sleeve inner diameter (ID) 41 onto an outer diameter (OD) 42 of rope 36 via a taper 43 formed in the sleeve and the taper 24 formed in the punch tooling.

Figure 7:
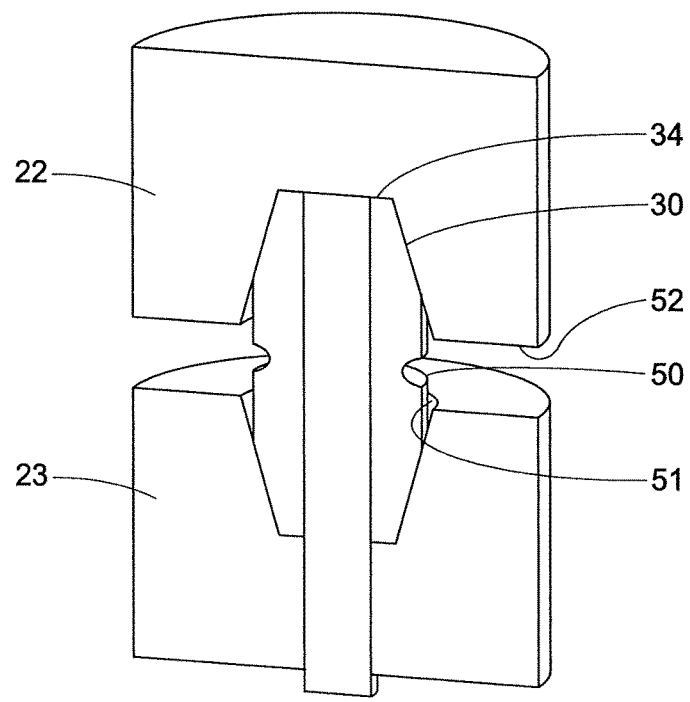
FIG. 7 is a perspective view of the stop sleeve with flash control grooves formed therein.

Referring to FIG. 7, another embodiment of the disclosure is absolute flash elimination can be achieved by adding flash control grooves 50 in outer diameter (OD) 51 of the axial end stop sleeve. The flash control grooves 50 serve to control flash which occurs at a parting line 52 of the tooling. These grooves collapse inward during the pressing of the sleeve thus eliminating flash by allowing the flash to flow into the void left by the groove.

Figure 8:
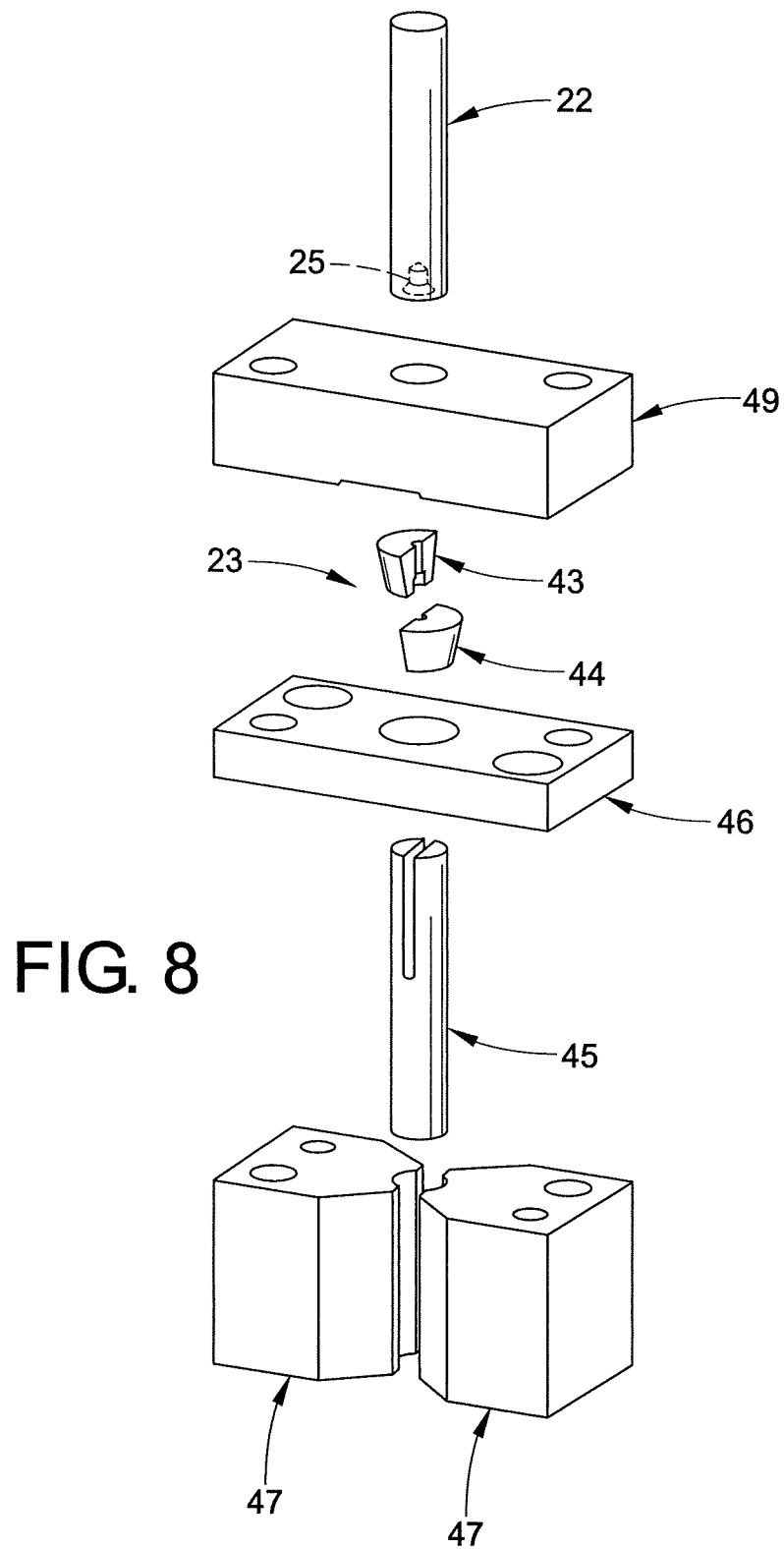
FIG. 8 is an exploded perspective view of a die forming assembly in accordance with another embodiment of the disclosure.

Referring to FIG. 8, lower die 23 can be split into two halves 43, 44 held within split form die holder 46. Halves 43, 44 facilitate easy removal of the crimped sleeve from the die assembly. Die ejector 45 is held within ejector guide 47 and is used to release the split dies 43, 44 from holder 46. Upper punch die 22 is provided and held within punch die holder 49.

Figure 10A:
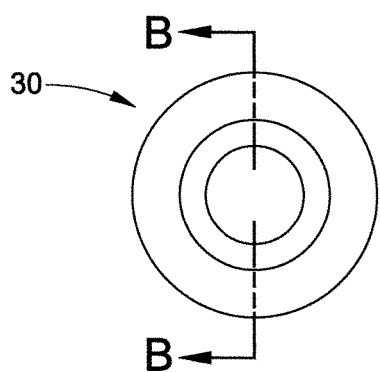
FIG. 10A is a front elevational view of a crimp end stop sleeve in accordance with another aspect of the disclosure.
Figure 10C:
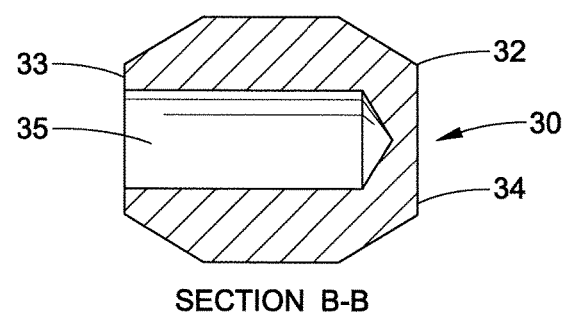
FIG. 10C is a side elevational view in cross section of the sleeve of FIG. 10A taken along lines B-B.
Figure 10B:
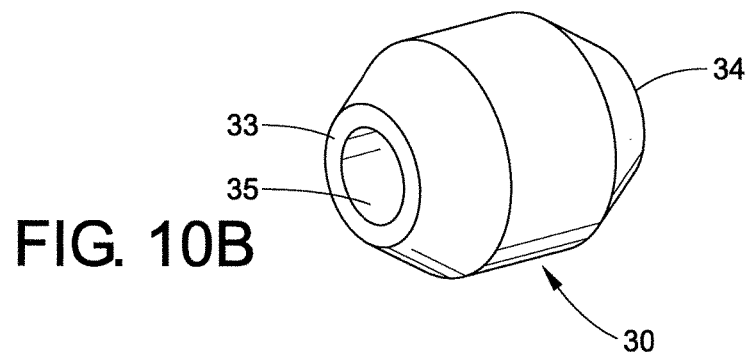
FIG. 10B is a perspective view of the crimp stop sleeve of FIG. 10A.

Referring now to FIGS. 10A-10C, end stop sleeve 30 is made from titanium in accordance with another embodiment of the disclosure. The crimp is performed with axial tooling die assembly shown in FIGS. 6, 7 and 8 similar to swaging ferrules onto tubes. This eliminates the axial flash that is common to all crimped stop sleeves that are made with the dies travelling transverse to the axis. Given the very small size window that this application requires, flash can be an issue. The axial method using the die of FIGS. 6 and 7 also allows tip 32 of the stop sleeve 30 to be completely formed into a closed end bullet nose 34. An open end 33 of the sleeve has opening 35 through which wire 36 extends.

Figure 9:
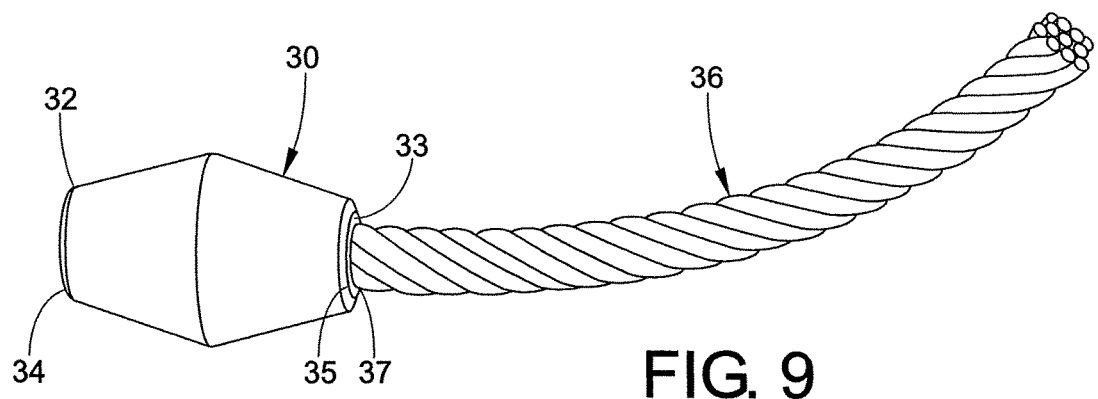
FIG. 9 is a side elevational view of a crimped sleeve on an end of the wire rope of FIG. 11.

One aspect of the disclosure is to crimp the stop sleeve 30 onto an end of a wire rope 36 as seen in FIG. 9, wherein the stop sleeve crimps the end of the wire rope. The wire rope can have various diameters, such as between 0.005 inches to 0.5 inches or more. However, other diameters are contemplated by the disclosure.

The finished crimped stop sleeve 30 on the end 37 of the wire rope 36 is shown in FIG. 9. The wire which can be synthetic or stranded extends from opening 35 of end 33 of the sleeve.

Thus, one embodiment of the disclosure is the finished crimped end stop sleeve is not to exceed a specified axial boundary. An example of an axial boundary is about 0.050 inches. The crimped wire 36 is to be flush to the bullet end 34 of the crimp sleeve (i.e., no wire protruding). The flush wire end of the crimp sleeve is to be rounded (i.e., bullet nose 34). The length of the crimp sleeve is often pressed to be about the same as the axial boundary.

The tensile strength of the end stop matches or is about equal to the tensile strength of the wire rope 36.

Another aspect of the disclosure is axial crimping of the stop sleeve 30 significantly reduces flash and controls a miniature size from the sleeve. The stop sleeve with the bullet nose and flush end 32 with the wire is used in lieu of a welded, soldered or a brazed stop.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the above description or the equivalents thereof.

The invention claimed is:

1. A stop sleeve assembly, comprising:
   a sleeve crimped by a die assembly which forms a tip of said sleeve into a closed end bullet and/or tapered nose wherein said sleeve is crimped onto an end of a wire rope such that said wire rope does not protrude from said closed end bullet and/or tapered nose, wherein said die assembly comprises a lower die with first and second die halves.

2. The stop sleeve assembly of claim 1, wherein a tensile strength of said stop sleeve is substantially equal to a tensile strength of said wire rope.

3. The stop sleeve assembly of claim 1, wherein said stop sleeve has a tapered outer wall.

4. The stop sleeve assembly of claim 1, wherein said stop sleeve is made from titanium.

5. The stop sleeve assembly of 1, wherein said wire rope is stranded wire rope or synthetic wire rope.

6. The stop sleeve assembly of 1, wherein said axial die assembly comprises an upper die and a lower die, wherein said upper die and said lower die each comprises an angled wall for increasing crimp force applied to said stop sleeve.

7. The stop sleeve assembly of claim 6, wherein force is applied along a longitudinal axis of said upper and lower die to said upper and lower die thereby crimping said stop sleeve onto said wire rope forming a flush end stop on said sleeve.

8. The stop sleeve assembly of claim 7, wherein a flash control groove is formed in an outer diameter of said stop sleeve at a parting line in said die assembly.

* * * * *